United States Patent [19]

Tsakiris et al.

[11] Patent Number: 5,204,768
[45] Date of Patent: Apr. 20, 1993

[54] REMOTE CONTROLLED ELECTRONIC PRESENTATION SYSTEM

[75] Inventors: Alexander L. Tsakiris; David L. Lawson, both of Dallas, Tex.

[73] Assignee: Mind Path Technologies, Inc., Dallas, Tex.

[21] Appl. No.: 654,485

[22] Filed: Feb. 12, 1991

[51] Int. Cl.⁵ .......................................... H04B 10/00
[52] U.S. Cl. .................................. 359/148; 359/143; 340/825.72; 358/194.1
[58] Field of Search ............... 359/142, 143, 146, 147, 359/148, 152; 455/2, 4, 352, 353; 340/825.22, 825.56, 825.72, 706, 717; 358/194.1, 84

[56] References Cited

U.S. PATENT DOCUMENTS

| | | | |
|---|---|---|---|
| 4,178,504 | 12/1979 | Farmer | 359/113 |
| 4,290,141 | 9/1981 | Anderson et al. | 455/2 |
| 4,626,848 | 12/1986 | Ehlers | 340/825.57 |
| 4,718,112 | 1/1988 | Shinoda | 359/148 |
| 4,760,442 | 7/1988 | O'Connell et al. | 359/118 |
| 4,817,203 | 5/1989 | Tsurumoto et al. | 359/148 |
| 4,841,368 | 6/1989 | Rumbolt et al. | 359/146 |
| 4,882,747 | 11/1989 | Williams | 359/148 |
| 4,885,632 | 12/1989 | Mabey et al. | 455/2 |
| 4,930,011 | 5/1990 | Kiewit | 455/2 |
| 4,989,081 | 1/1991 | Miyagawa et al. | 358/194.1 |
| 5,109,222 | 5/1992 | Welty | 359/142 |

Primary Examiner—Edward L. Coles, Sr.
Assistant Examiner—R. Bacares
Attorney, Agent, or Firm—Gregory W. Carr

[57] ABSTRACT

An electronic presentation system is presented utilizing a wireless remote for controlling a digital computer, one or more display or storage/playback devices and an audience response system. A Terminate and Stay Resident (TSR) program within the digital computer manages the wireless remote. The digital computer running the TSR program enables the wireless remote to operate any applications program, as well as to use the computer to add spontaneously certain special effects to the presentation and to control an audience response system. In addition, the computer downloads into the wireless remote control, via a wireless communications link, data commands and signalling parameters such as modulation scheme and communications protocol with which to enable the wireless remote to generate the correct signalling to operate predefined display or storage/playback device.

25 Claims, 8 Drawing Sheets

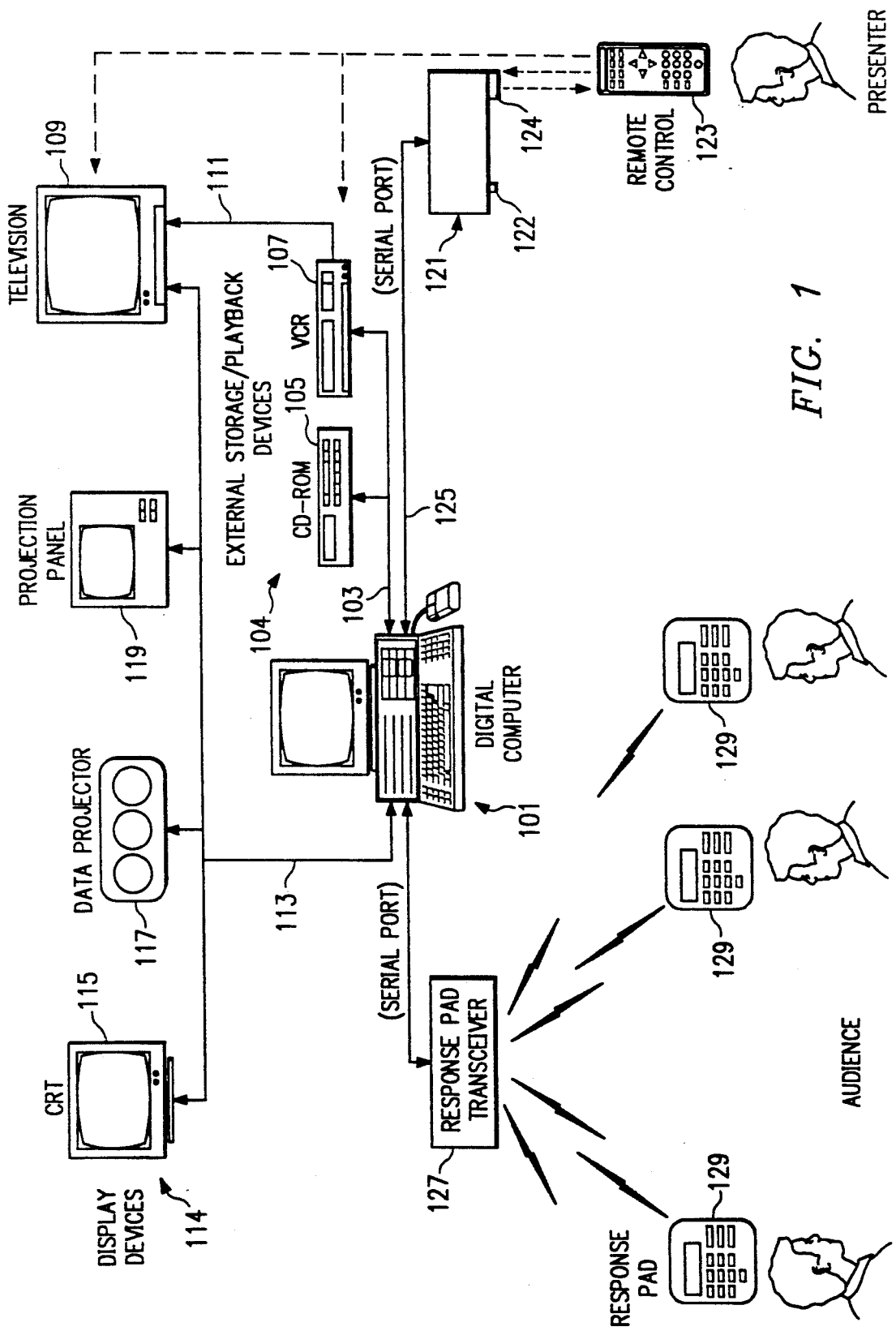

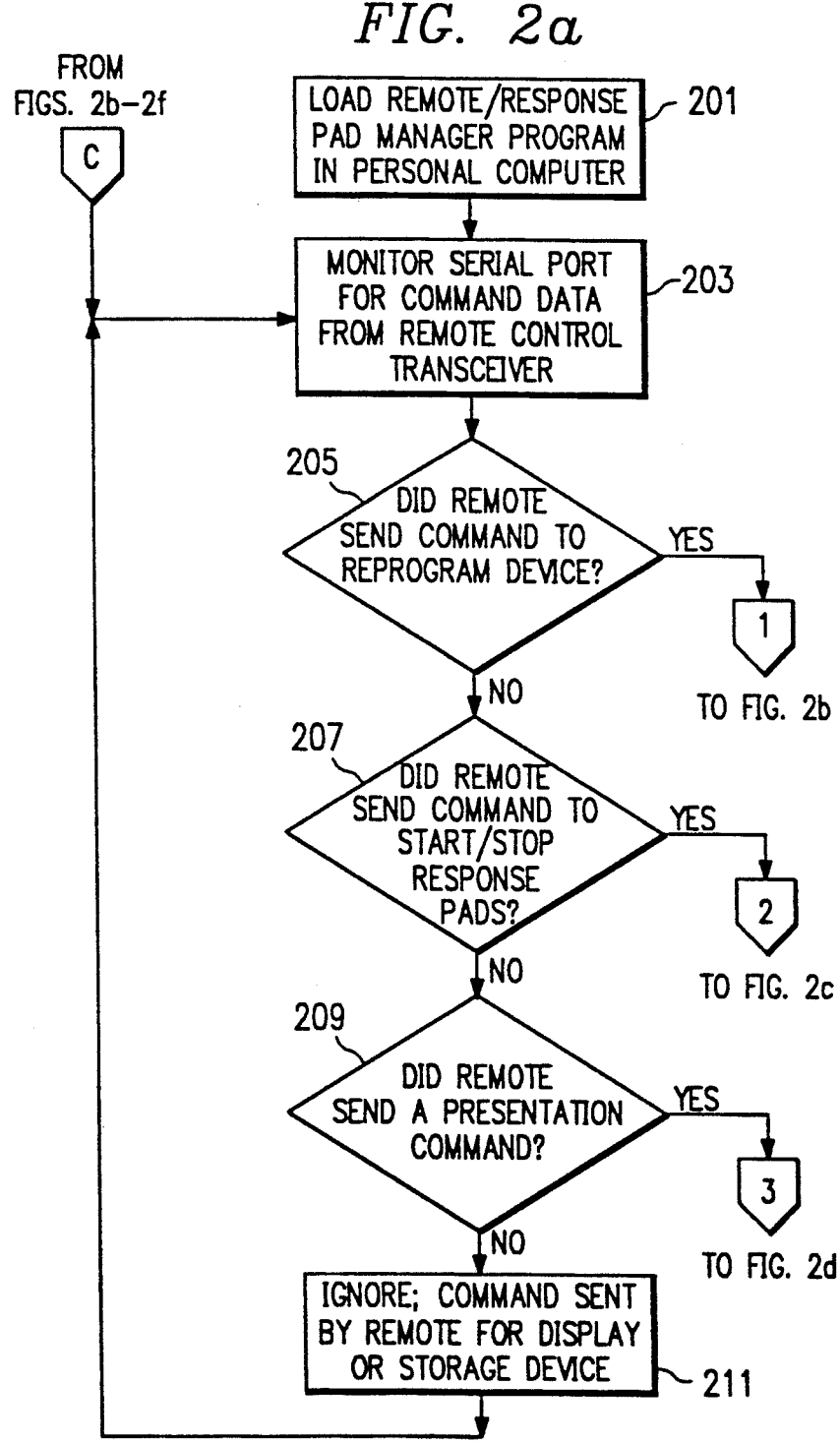

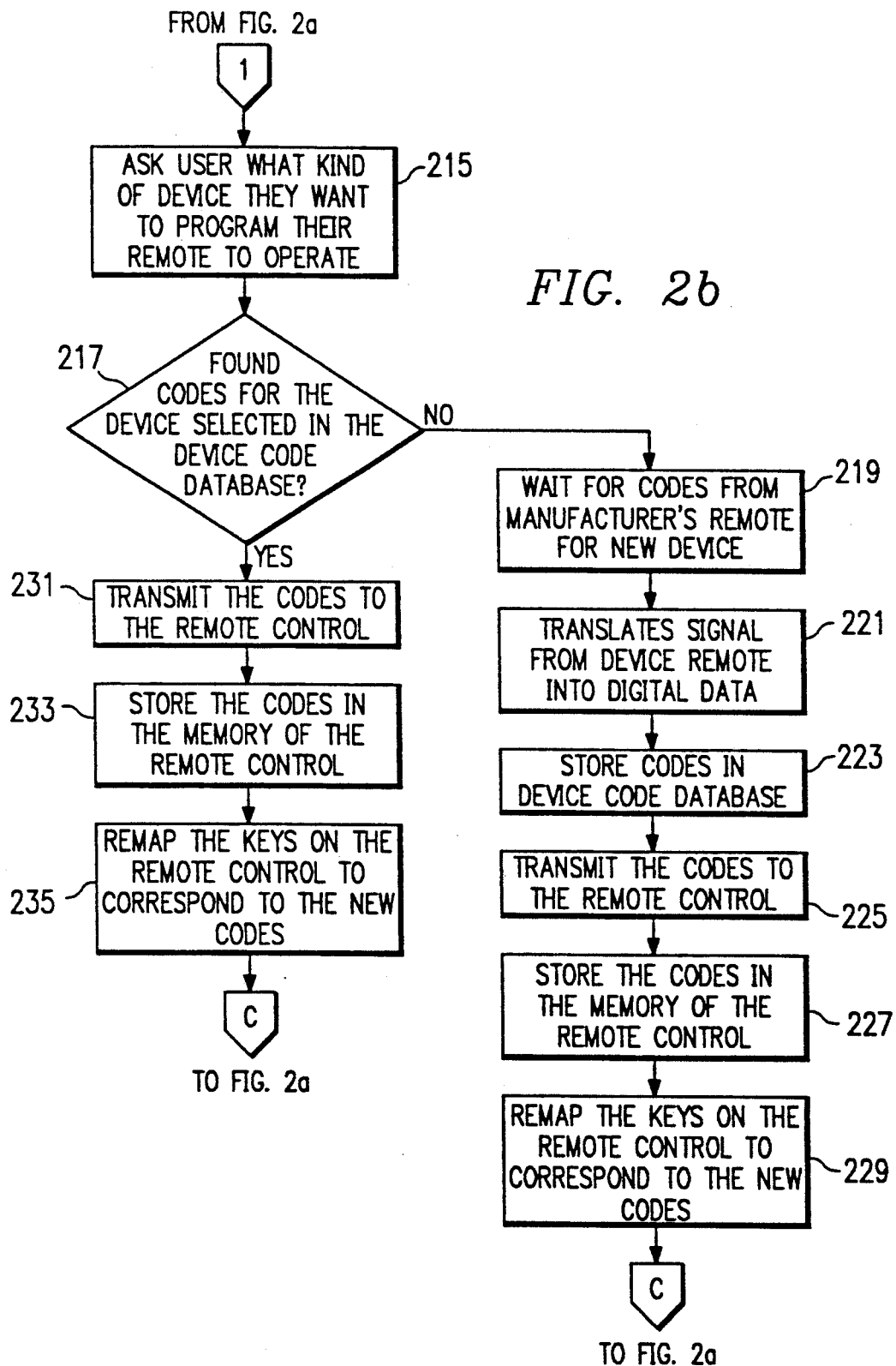

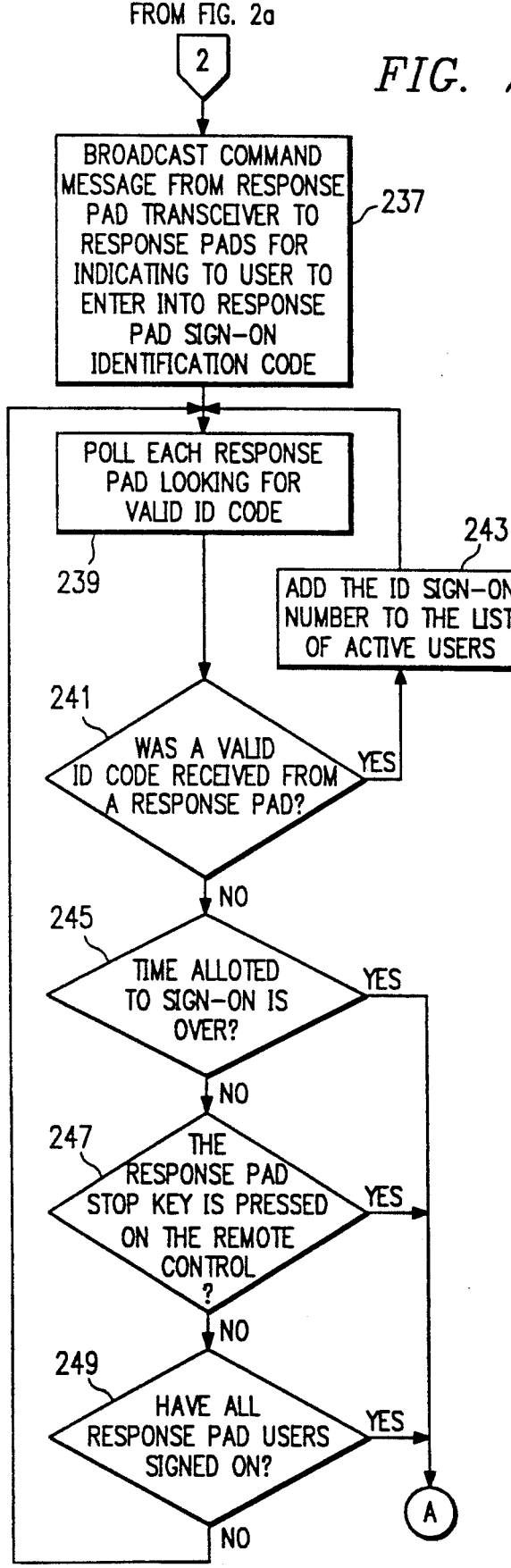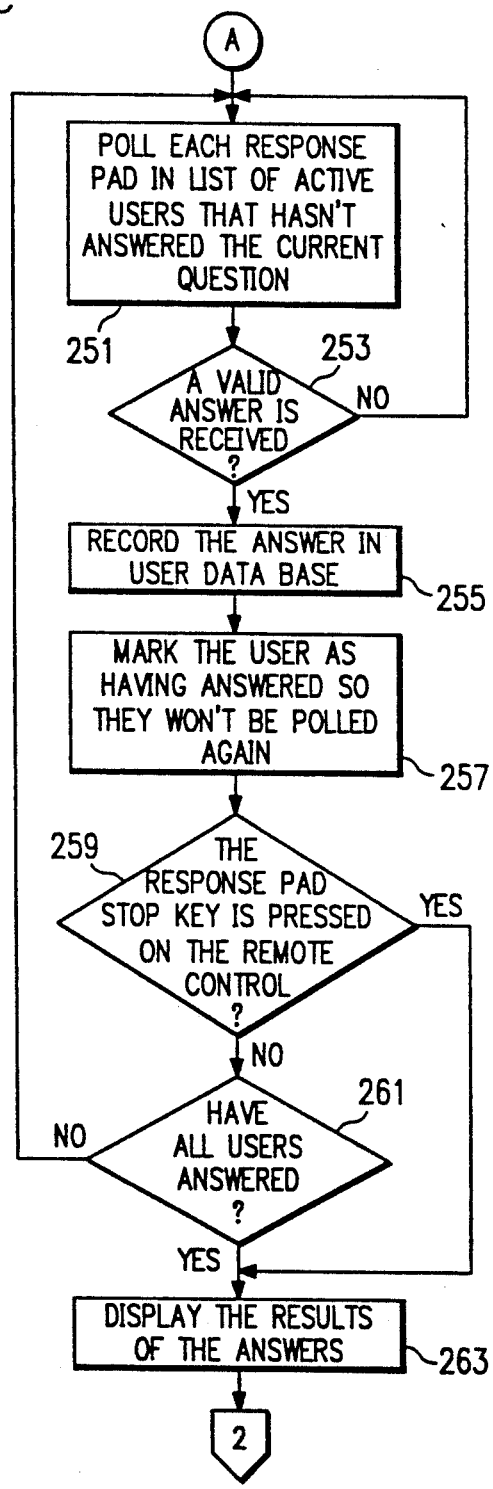
FIG. 2c

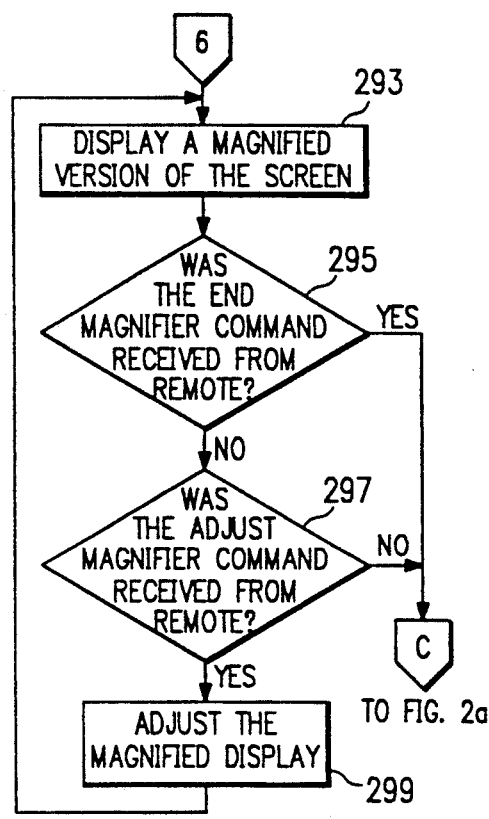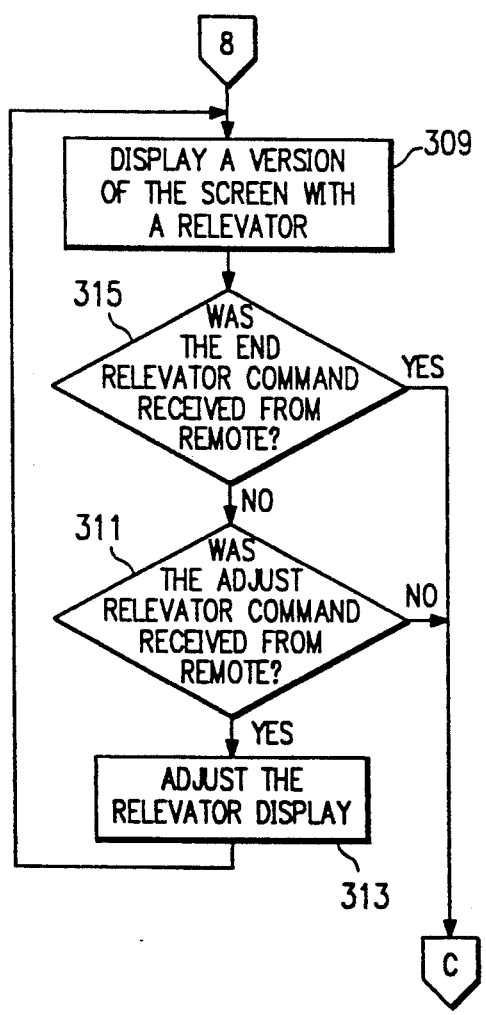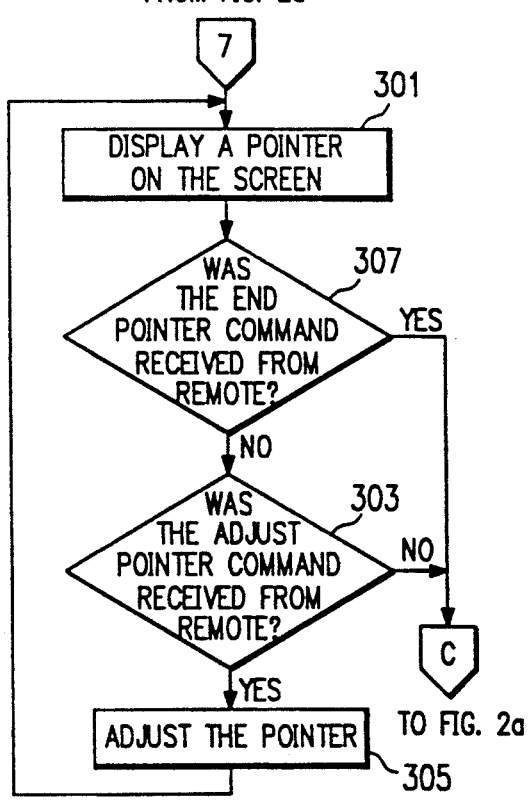
FIG. 2f

REMOTE CONTROLLED ELECTRONIC PRESENTATION SYSTEM

TECHNICAL FIELD

The invention pertains to a system for both presenting to an audience electronically stored images with a wireless remote keypad and receiving responses of the audience transmitted by a remote response pad.

BACKGROUND OF THE INVENTION

Thousands of years ago, ancient hunters described their exploits to each other with figures on the walls of the caves of Lascaux. Today, teachers of every type instruct students by drawing on blackboards; engineers draw diagrams on paper to describe their ideas to colleagues; executives explain with charts and graphs the performance of corporations, new plans and projections for growth. Even lawyers have come to rely on diagrams in the courtroom to explain difficult facts and to augment their advocacy skills. An image is a most effective mode of communicating ideas to an audience; and, when combined with speech, it delivers information with the greatest likelihood that the audience will understand and remember it. A picture is truly worth a thousand words.

Getting pictures in front of an audience, and presenting them in a meaningful fashion, can cost thousands of dollars and thousands of hours. The step of preparing individual images for a visual presentation has progressed from drawing on cave walls to computer programs that generate graphics from raw data to computer aided design. However, the step of presenting those images in sequence to an audience is still rather primitive: frequently it is done by reducing the images to a transparency or slide for overhead projection, or to a piece of card board. The presenter, or some assistant, must then physically move these "hard" copies. A presentation is, thus, often clumsy and difficult to handle, especially when there are a large number of pictures, graphs and charts.

Very recently, however, visual presentations have begun to move into the electronic age with displays of electronically stored images. Images or "screens" are first authored electronically, by a program on a personal computer, and then stored in a digital format in an optical, electronic or magnetic storage device. The order of images is also set, and any desired "transition" effects between images are added to link the images.

In addition to the already difficult task of giving a visual presentation, coordinating a presentation using electronically stored images has introduced a host of new problems associated with using the equipment.

A presenter must operate a personal computer during a presentation. Using previously existing wireless, remote keyboards for the personal computer, the presenter could move away from the computer during presentation. However, these wireless remote keyboards are just that: keyboards. A presenter must still operate the personal computer.

Also a presenter must be able to control, in addition to the personal computer, devices that display the images and the devices that store and play back the images. Take for example, a presenter who wants to integrate a "video clip" into the presentation. The video clip is stored on tape and played back on a VCR through a television set, or from an optical disk through a personal computer to a CRT or LCD device. The presenter then needs to control the colors, contrast or sound level on the display device, in addition to the starting and stopping, slow motion or other "built-in" features on the playback/storage device.

Where an audience's immediate response to the presentation is measured, such as in a test marketing situation, or where individual members are "quizzed", such as in a classroom, control is further complicated by the need for a response system integrated into the electronic presentation system and controllable by a presenter.

An electronic presentation system must further be adaptable and be able to accommodate various kinds of personal computers, program presentation managers and display equipment, as the presenter needs to have the ability to use the equipment that is available.

The presentation itself must be easily tailored or edited, even during the presentation, for the particular audience or to accommodate changes to the presentation introduced by the presenter. No one can predict how a presentation to, for example, the board of directors or to a classroom will proceed. Certain images will need to be repeated, others skipped, and perhaps even the order of the images rearranged. The presenter must be able to do more than simply command the presentation management program to proceed to the next screen. Further, presentation effects such as pointers, magnifiers and relevators, which emphasize important points, should be readily manipulatable during a presentation.

Finally, all of these capabilities must be made available to the finger tips of the presenter in an uncomplicated manner.

SUMMARY OF THE INVENTION

The invention is a remote management system for electronic presentations. It is adaptable to a wide variety of hardware used in electronic presentations, and provides total control over a presentation from a wireless remote.

The essential components of the electronic presentation system are a personal computer, an applications program stored in resident memory for managing the electronic images for presentation, a storage device on which the images (or data to reconstruct the images) are stored, and a display device.

The invention adds to these basic components a wireless remote control and a TSR (Terminate and Stay Resident) remote and response pad management program, which is a type of device driver program that operates in connection with the wireless remote and audience response pads for permitting a presenter to control with the wireless remote control, as desired, the applications program, the storage device, the display devices, and an audience response system. A presenter can use any type of application program for presentation management and any type of display, storage and playback equipment.

The wireless remote has basically three sets of keys. One set controls presentation effects, programming, and an audience response system; a second set of programmable keys operate one or more display or storage/playback devices; and a third set are function keys for causing the personal computer to execute predefined keystrokes stored by the computer for the purpose of controlling an applications program. The wireless remote control device communicates both with the personal computer, through a transceiver connected to the computer's serial interface, and directly to the other display, storage, or playback devices. It has a microprocessor and memory for handling communications and programming keys on the remote.

The TSR remote and response pad management program monitors the serial port of the personal computer and interrupts the application program when the personal computer receives command data from the transceiver for the wireless remote and executes the command. The TSR remote and response pad management program has several functions. It learns command data from remote controls for the various storage and playback devices, such as the different brands of televisions and VCRs, each of which has different data codes and signaling protocols, and stores these commands in a display/storage/playback device data file. To control specific devices (e.g. a Sharp ® television) used in a presentation, the wireless remote is programmed by the computer to operate the device by receiving data transmitted by the personal computer from the display, storage, and playback device file. Thus the presentation management system is, in effect, self-programming. All the user must do is tell the system what devices are being used.

The TSR remote response pad management program also implements certain presentation effect commands from the wireless remote, such as an on-screen pointer, a relevator for masking parts of the screen, and a screen magnifier. Further, when .a audience response system is used, the TSR program signs on and polls the response pads for answers, and keeps records of the audiences' answers.

BRIEF DESCRIPTION OF THE DRAWINGS

FIG. 1 is a block diagram of an electronic presentation system.

FIG. 2a is a flow diagram of operations performed by an electronic presentation system having a wireless remote control.

FIG. 2b is a continuation of the flow diagram begun in FIG. 2a.

FIG. 2b is a continuation of the flow diagram begun in FIG. 2a.

FIG. 2c is a continuation of the flow diagram begun in FIG. 2a.

FIG. 2e is a continuation of the flow diagram begun in FIG. 2a.

FIG. 2f is a continuation of the flow diagram begun in FIG. 2a.

DETAILED DESCRIPTION OF THE DRAWINGS

Figure 2D:
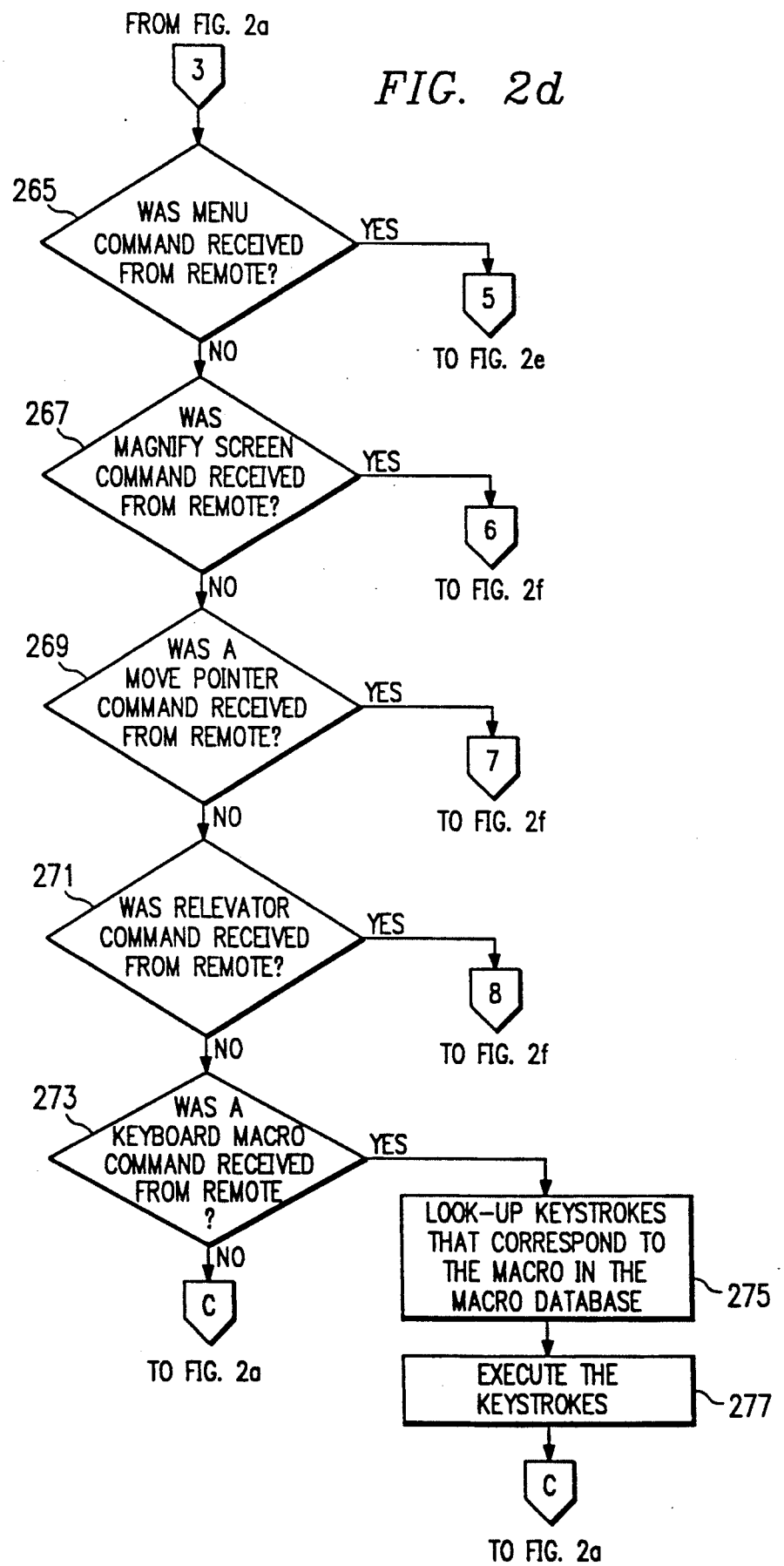
FIG. 2d is a continuation of the flow diagram begun in FIG. 2

Referring to FIG. 1, an electronic presentation system is shown. At the heart of the system is a digital computer 101. In most presentations, digital computer 101 is a "personal" computer, but can be any type of digital computer. The digital computer 101 has a central processing unit, usually in the form of a microprocessor; random access memory wherein applications programs are stored for execution; and data to be operated upon is stored on a "floppy" disk drive or a "hard" disk drive for storing additional data files and programs.

External storage devices 104 may also be used for storing data files and programs, especially very large data files that store digitized images for a visual presentation. These devices are connected to a properly interfaced port on the digital computer 101 with line 103. One example of an external storage device is a compact disk-read-only-memory (CD-ROM) 105.

Any type of optical, electro-optical, electromagnetic, or electrical digital storage device is suitable to be used in place of CD-ROM 105. Also shown connected with line 103 to digital computer 101 is a video cassette recorder (VCR) 107. A VCR 107 is an analog device that may be used to store motion pictures in an analog format or images in a digital format If motion pictures are stored in an analog format, the digital computer 101 must convert them from an analog to a digital format by connecting line 103 to an interface card with an analog to digital convertor. Most likely, however, the output of VCR 107 will be directly connected to a television 109 via line 111 for playback of the motion picture.

The digital computer 101 retrieves data representing an image, reconstructs the image from the data, if necessary, and formats it for a display device 114. Shown to be connected to digital computer 101 via line 113, are several display devices: a cathode ray tube (CRT) device 115; a data projector 117; a liquid crystal display (LCD) projection panel 119; and television 109.

Although these display devices are shown to be coupled to the digital computer with common line 113, each type of display device will likely require connection to separate ports on digital computer 101. For example, CRT display device 115 is likely to be connected to a Video Graphics Array (VGA) interface. A signal from digital computer 101 to television 109 will require that an interface converts digital data from the computer to an analog signal which will in turn modulate a radio frequency (RF) carrier signal of an appropriate frequency. Typically, only one type of display device 114 is used in a presentation, as most digital computers are unlikely to be equipped with all of the necessary interfaces. Of course, like display devices may be able to be run to the same port when the size of the audience requires multiple numbers of a given type of display device.

Digital computer 101 also handles the task of authoring digital images. The authoring process takes place prior to an electronic presentation, and therefore display devices need not be connected to the digital personal computer 101 at the time of authoring. An applications program run by digital computer 101 either takes data and creates images such as graphs and charts, takes existing files storing digital images and edits them, and/or creates images at the direction of the author. Functions and capabilities of the application programs that authors the images depends entirely upon the particular software used by the digital computer 101.

Once images are authored, the images are often linked together in a predetermined sequence with any desired transition effects between the images.

As different software uses different data formats for storing digital images, the same software that is used to author the software is typically used to manage the presentation with the digital computer 101. This software hereinafter is referred to as the presentation manager program. For example, some graphics software that can also be used as presentation managers typically store a specially coded version of data from which the image can be reconstructed and displayed during a presentation. Other software stores images by pixel-by-pixel.

Connected to a port of digital computer 101 is remote control transceiver 121. If the digital computer is a typical personal computer, the port is an RS232 asynchronous serial communications port. Data communicated between digital computer 101 and remote control transceiver 121 is in a standard ASCII format or protocol. Remote control transceiver 121 receives the asynchronous data from digital computer 101 on line 125 and modulates an infrared transmitter 122 in the remote control transceiver 121. Although any modulation scheme can be used, the infrared signal transmitted by the infrared transmitter 122 is pulse code modulated (PCM). Infrared transceiver 121 also detects with infrared photodetector 124 PCM modulated infrared signals from wireless remote control 123 and transmits the received data along line 125 to the digital computer 101. A two-way asynchronous communications link is thereby established between digital computer 101 and wireless remote control 123 through remote control transceiver 121.

Also connected to a port of digital computer 101, again preferably an RS232 interface port for asynchronous communications, is a response pad transceiver 127. In communication with response pad transceiver 127 are plurality of response pads 129, each of which is operated by a member of an audience to visual presentation. All together they form an audience response system. The response pad transceiver 127 and the response pads 129 utilize a radio frequency modulations scheme, such as FSK modulation, with which to transmit and receive data in an ASCII format.

To manage the wireless remote control and the audience response system a remote control and response pad management program is stored in the internal memory of the digital computer 101. The remote control and the response pad management program is a TSR or Terminate and Stay Resident program. When data is received at the serial port of digital computer 101 from either the remote control transceiver 121 or the response pad transceiver 127, the remote control and response pad management program interrupts the running of any applications program that the digital computer 101 is running, which is a presentation management program during an electronic presentation, and directs digital computer 101 to perform processes to carry out the command specified by the data received from the remote control transceiver 121. After digital computer 101 finishes the process, the remote control and response pad management program terminates, returning control of the digital computer to whatever applications program is in memory. Thus, the wireless remote control and audience response system can be used with almost any type of applications software, given the present invention's great adaptability.

Referring now to FIGS. 2a-2f, processes carried out by digital computer 101 (FIG. 1) when under control of the remote control and response pad management TSR program is outlined by the flow diagram shown.

Referring now to FIG. 2a, at step 201, loading the remote control and response pad manager program is loaded into digital computer 101 (FIG. 1). During step 203, digital computer 101 monitors the serial port connected to the remote control transceiver 121 (FIG. 1), and when data is received at its serial port, digital computer 101 interrupts the running of any applications program. At decision block 205, if the data is a command to reprogram wireless remote control 123 (FIG. 1) to operate a display device 114 (FIG. 1) or a storage/playback device 104 (FIG. 1), the remote control and response pad manager program directs the digital computer 101 to execute process steps in subroutine 1 shown in FIG. 2b.

As indicated by decision block 207, if the wireless remote 123 sent a command to start or stop response pads, the digital computer 101 executes the process steps in subroutine 2 that is shown in FIG. 2c. As indicated by decision block 209, if the wireless remote sent data that is a presentation command, the remote control and response pad manager program, at decision block 209, directs the digital computer to go to the process steps of subroutine 3 shown in FIG. 2d. Step 211 illustrates a hypothetical failure of the digital computer 101 to recognize the data as a command. In that event, the remote control and response pad manager program terminates but stays resident in the memory of the digital computer 101. The program will continue to monitor the serial port for command data from the remote control transceiver 121 as indicated by the return to block 203.

Referring now to FIG. 2b, the process of reprogramming wireless remote control 123 (FIG. 1) is shown. The digital computer 101 (FIG. 1) prompts the user of the wireless remote control 122 what kind of display or storage/playback device the wireless remote control 123 is to be programmed to operate. Typically, this is done by displaying on a video terminal display of the digital computer 101 a menu of devices for which there is stored in a device code data base in personal computer 101 data with which wireless remote control 123 is able to operate remotely the desired device.

If the device code data base does not store data with which to operate the device, the digital computer 101 begins a process at decision block 217 of learning codes from the manufacturer's remote control provided with the device. At step 219, the remote that is supplied with the device is held up to the infrared photo detector 124 (FIG. 1) and its keys depressed so that the infrared photo detector detects the infrared signals from the manufacturer's remote. Remote control transceiver 121 then provides an electrical signal equivalent to the infrared signal from the device remote to the serial port of digital computer 101. The digital computer 101 analyzes the signal received at the serial port and translates it at step 221.

Each manufacturer or vendor utilizes different infrared signalling techniques, communications protocols and data for command codes. For example, many manufacturers of display devices and storage/playback devices use pulse width modulation (PWM) of the infrared signal to asynchronously transmit data for command codes. Consequently, the digital computer must encode the infrared signals from the manufacture's remote into an ASCII formatted data pattern for the command from which the signalling can be reconstructed by the wireless remote control 123. This data, referred to as "device codes", is the data command codes for operating the various functions of the device and the parameters necessary to enable the wireless remote control 123 to signal the device with the correct modulation scheme and communication protocols.

The device codes are stored in the device code database, as indicated by step 223, and then transmitted at step 225 to the wireless remote control 123 for storage in the memory of the wireless remote control 123, as indicated by step 227. From these codes, a microprocessor (not shown) in the wireless remote control 123 generates the correct waveforms to modulate an infrared transmitter (not shown) for operating the display and storage/playback devices. Once the device codes are received by wireless remote control 123, it remaps, at step 229, its keys, according to data sent by digital computer 101, to the new device codes such that the correct device codes are retrieved when a particular key is depressed If the device code data base already stores the device codes for the display or storage/playback device to be operated by wireless remote control 123, digital computer 101 transmits the codes, at step 231, to the wireless remote control 123 through remote control transceiver 121 (FIG. 1). The wireless remote control 123 stores the codes in the memory of the remote control step 223. The wireless remote 123 then remaps, at step 235, its keys to the new device codes.

Referring now to FIG. 2c, if digital computer 101 (FIG. 1) receives from the remote control transceiver a start or a stop response pads command, the digital computer 101 proceeds to step 237 and transmits a data for sign-on command from its serial port to the response pad transceiver (FIG. 1) for broadcast to the response pads 129 (FIG. 1). Upon receipt of a sign-on command data, each response pad 129 indicates to its user to enter into the pad a sign-on identification code.

At step 239, digital computer 101, again by sending from the serial port of the digital computer to the response pad transceiver a data that acts as a polling code, polls each response pad looking for an identification code, as indicated by block 239. A response pad 129 polled by the digital computer 101 broadcasts the identification code entered into the response pad by the user, which is received by the response pad transceiver 127 and given to the digital computer 101 through its serial port.

At step 241, digital computer 101 checks that the identification code received from a response pad is valid and if so adds, at step 243, the sign-on identification code number to the list of active users. As indicated by decision blocks 245, 247 and 249, the digital computer 101 continues to poll response pads for valid sign-on identification codes until the time allotted for sign-on is either over, the response pad stop key on the wireless remote control 123 is pressed, or all the response pad users have signed on.

At step 251, upon command from the wireless remote control 123, digital computer 101 will poll each response pad 129 that is on the list of active users for a response or an answer entered into the memory of the response pad 129 by its user to a question asked during the presentation. If a valid answer is received from a response pad 129, the answer is recorded, at step 225, in a user database and the user is marked, at step 257, as having answered so that response pad will not be polled again. As indicated by decision block 253, if no valid answer is given, by a response pad 129, that response pad will be polled again, at step 259, unless the response pad stop key has been pressed on the wireless remote control 123, digital computer 101 continues to poll response pads that have not currently answered the question, and will do so until all the response pads have answered, as indicated by decision block 261, at which time the results of the answers are displayed, as shown by block 263.

Referring now to FIG. 2d, if digital computer 101 (FIG. 1) receives data at step 209 (FIG. 2a) from wireless remote control 123 (FIG. 1) that is a presentation command, digital computer 101 determines, with subroutine 3, whether a menu command was received, whether a magnify screen command was received, whether a move pointer was received, whether a relevator command was received or whether a keyboard macro command was received from the remote, as indicated by decision blocks 265, 267, 269, 271 and 273 respectively. If a keyboard macro command was received, digital computer 101 looks up the keystrokes that correspond to the macro command from a macro database file stored in digital computer 101, as indicated by block 275 and then executes the keystrokes by placing the keystrokes in the digital computer keyboard register and returns control of digital computer 101 to the applications program. Otherwise, depending on the command, digital computer moves on to subroutine 5, 6, 7 or 8.

Figure 2E:
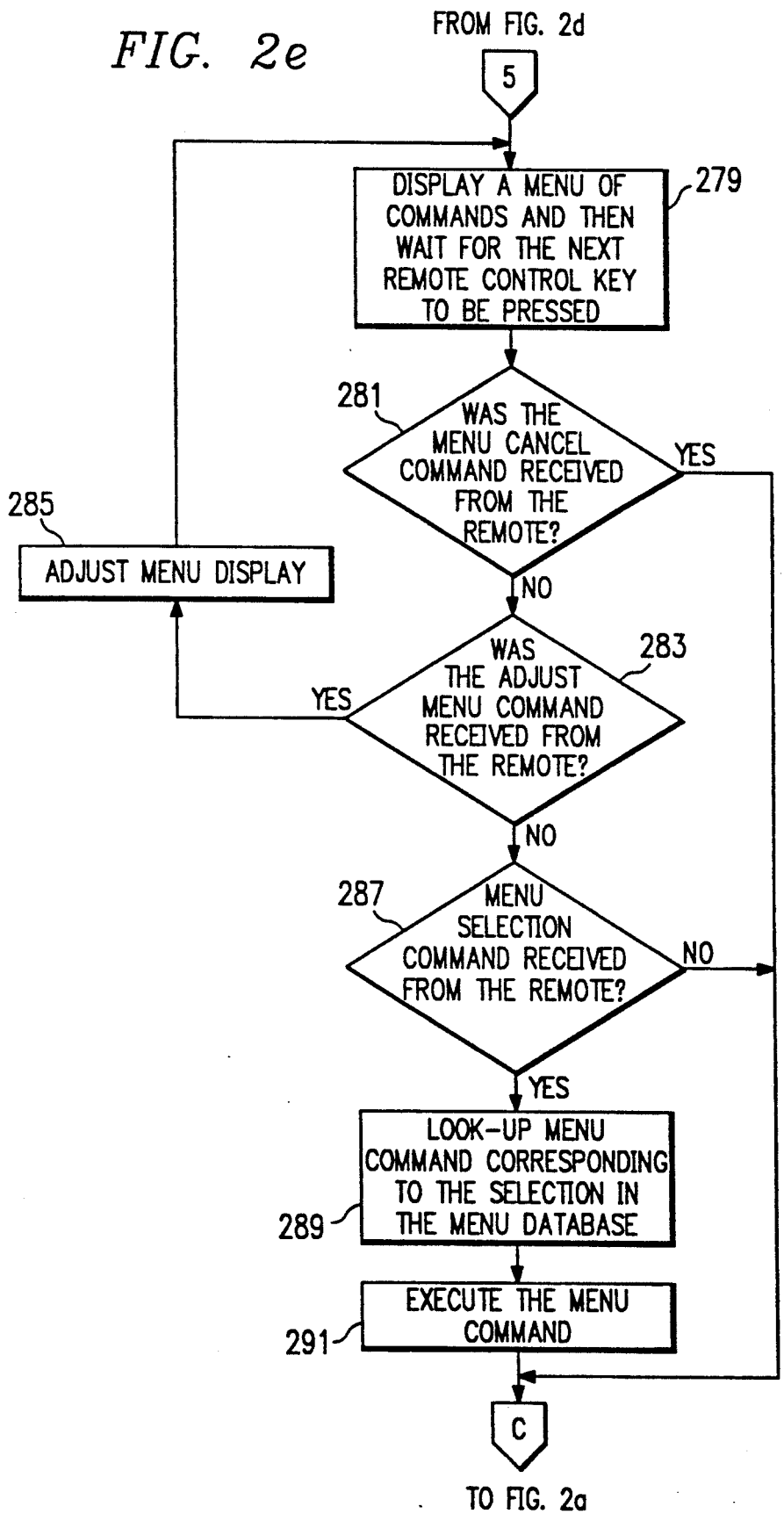

Now referring to FIG. 2e, if a display menu command was received in step 265 (FIG. 2d) digital computer 101 (FIG. 1) carries out a series of functions indicated by subroutine 5. At step 279, it displays on a Video Display Terminal (VDT) a menu of commands and then waits for the next remote control key to be pressed. If a menu cancel command is received at step 281, the remote control and response pad management program terminates its control of digital computer 101. If an adjust menu command is received at step 283, the menu is adjusted, at step 285, and the digital computer 101 displays the adjusted menu and waits for the next remote control key to be pressed, as indicated by the return arrow to step 279. If a menu selection command is received from the remote, the digital computer looks up the command corresponding to the selection in the menu database, as indicated by step 289, and executes the command in step 291.

Referring now to FIG. 2f, if a magnify screen command code is received at step 267 (FIG. 2d), digital computer 101 carries out the process of magnifying a section of the screen outlined in subroutine 6. The digital computer 101 magnifies the image on the screen of a display device 114. Magnification continues until an end magnifier command is received from the remote at step 295, at which time the remote control and response pad management program returns to block 203 (FIG. 2a) and terminates control. If an adjust magnifier command is received from the remote at step 297, the magnified display is adjusted in step 299 by moving it to the left, to the right, or up or down.

If a move pointer command is received at step 269, (FIG. 2d), digital computer 101 carries out the steps of subroutine 7. At step 301, digital computer displays a pointer on the screen of a display device 114 (FIG. 1). At steps 303 and 305, if an adjust pointer command is received from the wireless remote control 123 (FIG. 1), digital computer 101 adjusts the pointer by moving it left, right, or up or down. When an end pointer command is received at step 307, the remote control and response pad management program returns to step 203 circle 213 (FIG. 2a) and terminates, returning control of the digital computer 101 to an applications program if one is running.

With receipt of a relevator command at step 271 (FIG. 2d), digital computer 101 performs the operations of subroutine 8. At step 309, digital computer 101 marks a section of the display on display device 114 with a relevator. The position of the relevator is adjusted, at step 313, if an adjust relevator command is received at step 311. Once the end relevator command is received from the wireless remote control at 315, the digital computer 101 returns to step 203 (FIG. 2a) and returns control of the digital computer to an applications program, if any.

Figure 3:
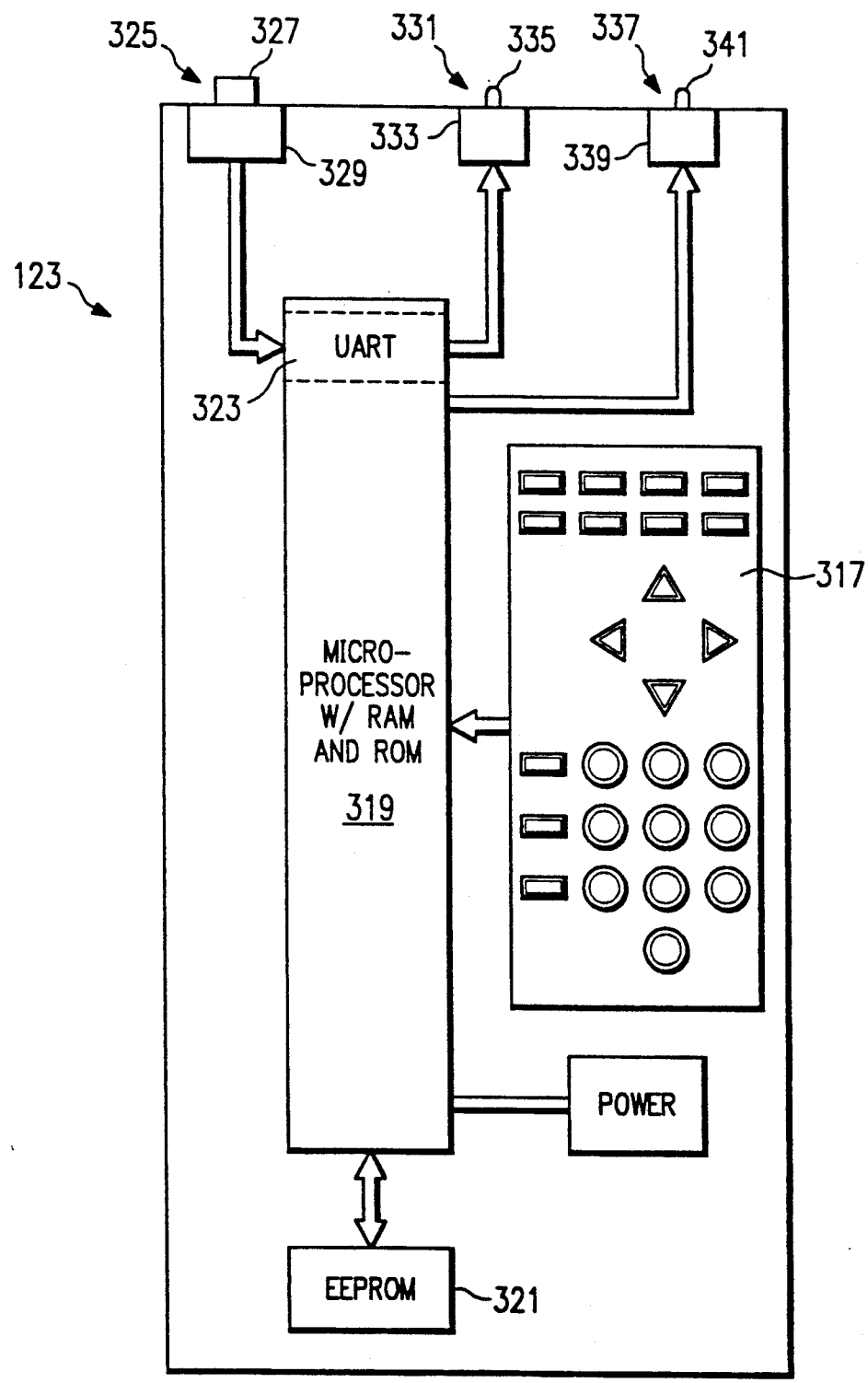
FIG. 3 is a block schematic diagram of a wireless remote control for remotely controlling an electronic presentation system.

Referring now to FIG. 3, a block schematic diagram of wireless remote control 123 (FIG. 1) is shown. A keypad 317 is coupled to a microprocessor 319. Microprocessor 319 has internal random access memory and read only memory storage. A Motorola® 68HC05 Microprocessor is used in the preferred embodiment for microprocessor 319. Microprocessor 319 also contains a universal asynchronous receiver transmitter (UART) 323. Also coupled to microprocessor 319 is electronically erasable programmable read only memory (EEPROM) 321 or other type of non-volatile memory.

Connected to the input of the UART 323 is an infrared receiver 325. Infrared receiver 325 has an infrared photodetector 327 connected to an interface unit 329 for interfacing the output of the photodetector 327 to the UART 323.

The output of the UART is connected to infrared transmitter 331. Infrared transmitter 331 has an interface 333 for interfacing the output of the UART 323 to a light emitting diode (LED) 335 such that data from the UART pulse code modulates the infrared signal emitted by the LED. The UART 323, through infrared transmitter 331, is in two-way communication with the remote control transceiver 121 (FIG. 1) data in eleven bit frames, where the first and last bit are stop and start bit, respectively, eight bits are an ASCII coded character, and the remaining bit is a parity bit. Since most digital computers 101 utilize a UART in their microprocessors for serial communication, and since most characters are encoded in an ASCII format, no special encoding or decoding is required for communication. Wireless remote control 123 and remote control transceiver can be used with most digital computers without modification.

In case a command is sent to the digital computer 101, microprocessor retrieves the actual ASCII coded data stored in microprocessor's 319 internal ROM and provides it to UART 323, which frames it according to proper ASCII communication protocol for asynchronous transmission to a digital computer 101 via infrared transmitter 331 and remote transceiver 121.

A second infrared transmitter 337, having interface 339 that includes infrared remote control transmitter clip for modulating LED 341 at a predetermined frequency, is connected to an output pin of microprocessor 319. The second infrared transmitter 337 is not, however, connected to the output of UART 323. The second infrared transmitter 337 is used to communicate with display devices 114 (FIG. 1) and storage/playback devices 104 (FIG. 1). The display and storage/playback devices utilize a wide variety of communication protocols, data formats and modulation schemes. For example, some of the display devices detect pulse width modulated infrared signals. Others may use pulse position modulation (PPM) or pulse code modulation (PCM). In order to operate these devices, microprocessor 319 is programmed to generate the proper waveforms for modulating infrared transmitter 337, using device code data stored in EEPROM 321. The device codes stored in EEPROM 321 include the command code for operating the device, communication protocols used by the device, and parameters describing the modulation or signalling scheme. For example, in a pulse width modulation scheme, the device codes include the data pattern to be sent by the wireless remote control 123, the width of the pulses for each bit or symbol, and the bit period. The program for generating the correct waveforms is stored in the internal ROM of the microprocessor 319.

Microprocessor 319 also handles the mapping of keys on keypad 317 to the location in which the corresponding command data and other parameters necessary for communicating with the display or storage/playback devices 114 and 104 is stored in EEPROM 321. If a key on keypad 317 is depressed for operation of a display or storage/playback, the corresponding data pattern and instructions for generating the waveform with that data pattern is retrieved from EEPROM 321 by the microprocessor 319, the microprocessor 319 then generates the proper waveform to be supplied to infrared transmitter 337. Digital computer 101 stores and sends to the wireless remote control 123 with the device codes the mapping of the device codes to the keys on keypad 317. For example, an "arrow up" key can be programmed either to increase the volume of a sound system or to change a channel on the television system.

The invention has been described in connection with a preferred embodiment. This description is not intended to limit the scope of the invention to the particular form set forth, but, on the contrary, it is intended to cover such alternatives, modifications, and equivalents as may be included within the spirit and scope of the invention as defined in the appended claims.

We claim:

1. A remote controlled electronic system for controlling one or more remotely controllable electronic devices according to transmitted control signals, comprising:
   a computer processing unit having a data storage device for storing keypad programming data;
   transceiver means coupled to said computer processing unit for transmitting keypad programming data over a wireless communications link and receiving control signals to selectively operate the computer processing unit; and
   a wireless remote control unit having a programmable keypad, means for receiving keypad programming data as stored in the computer processing unit and transmitted by said transceiver means over the wireless communications link, means for transmitting control signals over the wireless communications link, and means responsive to said received keypad programming data for programming the keypad and for configuring the wireless remote control unit to generate, in response to actuation of keys on the keypad, control signals reconstructed from the received keypad programming data and transmitted by the means for transmitting over the wireless communications link to selectively operate the computer processing unit and each electronic device.

2. The remote controlled electronic system as in claim 1 wherein said wireless communications link is an infrared communications link.

3. The remote controlled electronic system as in claim 2 wherein said transceiver means comprises an infrared transmitter and photodetector.

4. The remote controlled electronic system as in claim 2 wherein said means for transmitting comprises an infrared transmitter and said means for receiving comprises an infrared photodetector.

5. The remote controlled electronic system as in claim 1 wherein said electronic devices comprise a means for presenting electronic images.

6. The remote controlled electronic system as in claim 1 wherein the means for programming and for configuring of the wireless remote comprises:
   a central control unit coupled to the means for transmitting, the means for receiving and the programmable keypad; and
   a means for data storage coupled to said central control unit for storing received keypad programming data, said central control unit accessing the stored keypad programming data in response to keypad actuation to reconstruct and generate control signals for transmission over the wireless communications link to selectively operate the computer and each electronic device.

7. The remote controlled electronic system as in claim 6 wherein said central control unit comprises a microprocessor.

8. The remote controlled electronic system as in claim 6 wherein said means for transmitting comprises:
   a first infrared transmitter coupled to said central control unit for transmitting control signals generated by said central control unit according to the keypad programming data to said transceiver means for operating said computer processing unit; and
   a second infrared transmitter coupled to said control unit for transmitting control signals generated by said central control unit according to the keypad programming data directly to each electronic device for controlled operation thereof.

9. The remote controlled electronic system as in claim 8 wherein said first infrared transmitter is coupled to the central control unit through a universal asynchronous receiver transmitter (UART).

10. The remote controlled electronic system as in claim 1 wherein the computer processing unit monitors the wireless communication link for transmission of control signals from said wireless remote control unit directed to the computer processing unit and upon detection of such transmission interrupts operation of any applications program currently being executed to enable the programmable keypad to selectively control the operation of the computer processing unit, returning to executing the applications program after the transmitted control signal has been serviced.

11. The remote controlled electronic system as in claim 1 further comprising a remote response pad having a number of keys and a means for transmitting response data to be received and processed by the computer processing unit.

12. The remote controlled electronic system as in claim 11 further comprising a response pad transceiver unit coupled to the central processing unit for receiving response pad data transmitted by the remote response pad.

13. The remote controlled electronic system as in claim 12 wherein the response pad transceiver unit receives response pad data over a second wireless communication link.

14. The remote controlled electronic system as in claim 13 wherein the second wireless communications link comprises an RF communications link.

15. A communications system for remotely controlling at least one remotely controlled device according to designated control signals reconstructed from known keypad programming codes, comprising:
   a computer including a memory device for storing known keypad programming codes for each remotely controlled device;
   computer transceiver means for transmitting keypad programming codes from the computer and receiving control signals for operating the computer over a wireless communications link; and
   a programmable wireless remote keypad controller having a number of individually programmable keys, remote transceiver means for receiving keypad programming codes transmitted from the computer and for transmitting control signals over the wireless link, and means responsive to said received keypad programming codes for programming the keypad and for configuring the wireless remote to generate, in response to keypad actuation, control signals reconstructed from the received keypad programming codes for output by the remote transceiver means to operate the computer and each device in the communications system.

16. The remote controlled electronic system as in claim 15 wherein said wireless communication link is an infrared communications link and wherein said computer and remote transceiver means are each comprised of an infrared transmitter and photodetector.

17. The remote controlled electronic system as in claim 15 wherein the means for programming and for configuring of the wireless remote comprises:
   a microprocessor having means for generating control signals, said microprocessor coupled to the keys of the keypad and the remote transceiver means; and
   a memory storage area coupled to the microprocessor for storing keypad programming codes, said microprocessor accessing the stored codes to individually configure keys on the keypad such that selection of a key will cause the microprocessor to reconstruct from the stored codes, generate and transmit the control signals required to selectively operate the computer and each device.

18. The remote controlled electronic system as in claim 15 wherein the remote transceiver means comprises:
   a first infrared transmitter for transmitting control signals over the wireless link to the computer; and
   a second infrared transmitter for transmitting control signals over the wireless link to each remotely controlled device.

19. The remote controlled electronic system as in claim 18 further including means for coupling the computer to each remotely controlled device whereby enabling the computer, in response to control signals transmitted by said remote keypad controller, to control operation of each device.

20. A communications management system for remotely controlling the operation of one or more remotely controlled electronic devices according to designated control signals reconstructed from known keypad programming codes, comprising:
   a computer having means for storing known keypad programming codes and means for transmitting known keypad programming codes over a wireless communications link; and a wireless remote control unit having a programmable keypad, means for receiving keypad programming codes transmitted from said computer over the wireless communications link, means for transmitting control signals, and means responsive to said received keypad programming codes for programming the keypad and for configuring the wireless remote to generate, in response to keypad actuation, control signals reconstructed from the received keypad programming codes for output by said means for transmitting over the wireless communications link to control operation of said electronic devices.

21. The remote management system as in claim 20 wherein the computer is coupled directly to control the electronic devices and the computer monitors the wireless communication link for transmission of control signals from said wireless remote to the computer and upon detection interrupts operation of an applications program currently being executed therein to respond to the transmitted control signal and control operation of the coupled electronic device.

22. The remote management system as in claim 20 further comprising a remote response system having one or more wireless remote response pads and a response transceiver coupled to the computer to receive response data over and RF communication link.

23. A reconfigurable remote control for remotely controlling remotely controllable electronic devices with transmitted control signals reconstructed from known device codes, comprising:
a programmable keypad;
remote transmitter means for transmitting control signals over a remote communications link to remotely control operation of each device;
remote receiver means for receiving known device codes from a remote source via the remote communications link; and
processing means for programming the keypad in response to received device codes and for configuring the remote controller to generate, in response to selection of keys on the keypad, control signals reconstructed from the received device codes for output by said remote transmitter means to control the operation of each device.

24. A remotely controlled audio-visual presentation system, comprising:
at least one audio-visual presentation device;
a central processing unit coupled to each presentation device including:
means for transmitting audio-visual information for presentation thereon;
means for controlling the operation of each device and the selective presentation of transmitted audio-visual information thereon;
means for receiving and storing audio-visual information and remote device codes; and
means for receiving control signals for controlling operation of the processing unit;
means for transmitting the stored remote device codes from the central processing unit over a remote communications link; and
a remote controller having:
a keypad;
means for receiving via the remote communications link transmitted remote device codes;
processing means responsive to the received remote device codes for configuring the remote controller to control each presentation device; and
means for transmitting, in response to actuation of keys on the keypad, control signals reconstructed from the remote device codes by the processing means via a wireless communications link to control the operation of the central processing unit and each presentation device and the presentation of audio-visual information.

25. The reconfigurable remote control as in claim 23 wherein the remote source comprises:
means for storing the known device codes for each remotely controllable electronic device;
transceiver means for receiving control signals from the remote control and for transmitting known device codes to the remote control via the remote communications link; and
processor means responsive to received control signals transmitted by the remote control for causing selected known device codes stored in the means for storing to be transmitted to the remote control via the remote communications link.

* * * * *

UNITED STATES PATENT AND TRADEMARK OFFICE
CERTIFICATE OF CORRECTION

PATENT NO. : 5,204,768
APPLICATION NO. : 07/654485
DATED : April 20, 1993
INVENTOR(S) : Alexander L. Tsakiris et al.

It is certified that error appears in the above-identified patent and that said Letters Patent is hereby corrected as shown below:

On the Title Page:
Item [75] Inventors: "Alexander L. Tsakiris; David L. Lawson, ..." should read
--Alexander L. Tsakiris; David R. Lawson, ...--.

Signed and Sealed this

Third Day of November, 2009

David J. Kappos
*Director of the United States Patent and Trademark Office*